(12) United States Patent
Burgess et al.

(10) Patent No.: US 10,710,280 B2
(45) Date of Patent: Jul. 14, 2020

(54) METHODS OF FORMING SEALS

(71) Applicant: The Boeing Company, Chicago, IL (US)

(72) Inventors: Robert Marshall Burgess, Seattle, WA (US); Matthew G. Chaney, Marysville, WA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 15/701,674

(22) Filed: Sep. 12, 2017

(65) Prior Publication Data
US 2018/0001519 A1     Jan. 4, 2018

Related U.S. Application Data

(62) Division of application No. 14/457,858, filed on Aug. 12, 2014, now Pat. No. 9,808,965.

(51) Int. Cl.
| | | |
|---|---|---|
| *B29C 39/02* | (2006.01) | |
| *B64D 45/02* | (2006.01) | |
| *F16B 37/14* | (2006.01) | |
| *F16B 33/00* | (2006.01) | |
| *B29L 31/26* | (2006.01) | |

(52) U.S. Cl.
CPC ............ *B29C 39/026* (2013.01); *B64D 45/02* (2013.01); *F16B 33/004* (2013.01); *F16B 37/14* (2013.01); *B29L 2031/26* (2013.01)

(58) Field of Classification Search
CPC ..... B29C 39/026; B29C 65/60; B29C 65/606; B29C 66/545; B29C 2014/14459; F16B 37/14; F16B 33/004; F16B 19/008; F16B 43/001; F16B 39/026; B64D 45/02; B29L 2031/26

USPC ........ 248/565, 576–579, 586–587, 590, 594, 248/597, 623–626; 411/12; 16/44, 72; 264/268, 262, 271.1, 263, DIG. 54; 277/650, 316, 637, 652, 645, 917, 944; 249/117, 134

See application file for complete search history.

(56) References Cited

U.S. PATENT DOCUMENTS

| | | | | |
|---|---|---|---|---|
| 2,710,113 | A | | 6/1955 | Pritchard |
| 3,470,787 | A | * | 10/1969 | Mackie ................ F16B 33/004 411/377 |
| 4,886,405 | A | | 12/1989 | Blomberg |

(Continued)

FOREIGN PATENT DOCUMENTS

| | | |
|---|---|---|
| CN | 101566231 A | 10/2009 |
| DE | 20218372 U1 | 5/2004 |

(Continued)

OTHER PUBLICATIONS

"Canadian Application Serial No. 2,894,343, Office Action dated Sep. 10, 2019", 16 pgs.

(Continued)

*Primary Examiner* — Leith S Shafi
(74) *Attorney, Agent, or Firm* — Kwan & Olynick LLP

(57) ABSTRACT

A method of forming a seal about at least a portion of an object comprises placing a form about at least the portion of the object, flowing a viscous substance into the form and about at least the portion of the object, and removing the form from the object by unwinding or unraveling the form to form the seal.

20 Claims, 10 Drawing Sheets

(56) References Cited

U.S. PATENT DOCUMENTS

| | | | | |
|---|---|---|---|---|
| 4,971,745 | A | * | 11/1990 | Ferenc ............... B29C 45/14336 264/263 |
| 9,808,965 | B2 | | 11/2017 | Burgess et al. |
| 2012/0155987 | A1 | * | 6/2012 | Watanabe ............... B64D 45/02 411/337 |
| 2013/0186552 | A1 | * | 7/2013 | Asahara ................ F16B 39/225 156/92 |
| 2013/0223951 | A1 | * | 8/2013 | Bessho .................. B64D 45/02 411/337 |
| 2016/0046046 | A1 | | 2/2016 | Burgess et al. |
| 2016/0195125 | A1 | * | 7/2016 | Dobbin ................. B64D 45/02 411/82.1 |
| 2017/0082131 | A1 | * | 3/2017 | Bessho ................. F16B 33/004 |

FOREIGN PATENT DOCUMENTS

| | | |
|---|---|---|
| EP | 2985476 A1 | 2/2016 |
| JP | H02031017 A | 2/1990 |
| JP | H0369808 A | 3/1991 |
| JP | 2013019512 A | 1/2013 |

OTHER PUBLICATIONS

"U.S. Appl. No. 14/457,858, Examiner Interview Summary dated Feb. 23, 2017", 3 pages.
"U.S. Appl. No. 14/457,858, Non Final Office Action dated Jan. 9, 2017", 11 pages.
"U.S. Appl. No. 14/457,858, Non Final Office Action dated Oct. 6, 2016", 11 pages.
"U.S. Appl. No. 14/457,858, Notice of Allowance dated Jun. 14, 2017", 8 pages.
"U.S. Appl. No. 14/457,858, Restriction Requirement dated Aug. 1, 2016", 6 pages.
"Canadian Application Serial No. 2,894,343, Office Action dated Mar. 8, 2017", 4 pgs.
"European Application Serial No. EP 15 17 3046.2 filed Jan. 15, 2016".
"Foremost Spring", Retrieved from internet Dec. 29, 2016: http://foremostspring.com/springs_compression_ends.html, Nov. 19, 2008, 5 pages.
"PPG-DESOTO International, Inc", Technical Data-PR 1776 Class C Low Weight Fuel Tank Sealant, PPG-Aerospace, Sylmar, CA, Jul. 2010.
"Canadian Application Serial No. 2,894,343, Office Action dated Feb. 8, 2019", 7 pgs.
"Japanese Application Serial No. 2015-127248, Office Action dated May 14, 2019", 41 pgs.
Canadian Application Serial No. 2,894,343, Office Action dated Feb. 1, 2018, 3 pgs.
Chinese Application Serial No. 201510489206.X, Office Action dated Jan. 4, 2018, 31 pgs.
Chinese Application Serial No. 201510489206.X, Office Action dated Sep. 18, 2018, 5 pgs.
European Application Serial No. 18185648.5, Search Report dated Dec. 6, 2018, 7 pgs.
Brazilian Application Serial No. 102015019237, Office Action dated Dec. 6, 2019, 6 pgs.

\* cited by examiner

METHODS OF FORMING SEALS

CROSS-REFERENCE TO RELATED APPLICATIONS

This application is a divisional of U.S. application Ser. No. 14/457,858, entitled "APPARATUSES AND METHODS FOR SEAL CAP INSTALLATION," filed on Aug. 12, 2014, which has been granted as U.S. Pat. No. 9,808,965 on Nov. 7, 2017 and which is incorporated herein by reference in its entirety for all purposes.

BACKGROUND

In fuel receptacles of vehicles, such as aircraft, fasteners penetrating the fuel receptacle must be electrically insulated to protect the vehicle from electromagnetic effect (EME) phenomena, e.g. lightning strikes. Conventionally, portions of fasteners protruding inside the fuel receptacle are provided with sealing (seal) caps for purposes of mitigating EME phenomena and/or for addressing other sealing requirements, if any.

Some seal caps are formed by manually discharging (daubing) a volume of viscous curable sealant over each fastener. However, seal caps formed using the daubing process may not meet critical dimensional requirements due to slumping of uncured sealant.

Alternatively, seal caps may utilize a pre-cured exterior shell, the installation of which requires several time-consuming steps, such as cleaning, pre-filling with viscous sealant, locating over a fastener, and careful application to the fastener to achieve squeeze-out of sealant from the shell in an effort to eliminate voids and entrapped air within the sealant. Specification requirements necessitate removal and/or smoothing (fairing) of squeezed-out sealant, further increasing manufacturing cycle time. Regardless of the fabrication method, conventional seal caps invariably require inspection, with time-consuming rework often being necessary.

SUMMARY

Accordingly, apparatuses and methods, intended to address the above-identified concerns, would find utility.

The following is a non-exclusive list of examples of the subject matter according the present disclosure, which may or may not be claimed.

One example of the present disclosure relates to a form for supporting a volume of a viscous substance encapsulating at least a portion of an object while the viscous substance solidifies to form a seal. The form comprises a non-metallic solidified material, a distal axial opening, a proximal axial opening, and a lateral wall between the distal axial opening and the proximal axial opening. The lateral wall comprises an outwardly facing surface having a surface area, and at least one through lateral opening.

Another example of the present disclosure relates to a vehicle comprising a chassis comprising a receptacle, a plurality of fasteners protruding into the receptacle, and a seal installed on each one of the plurality of fasteners protruding into the receptacle. At least some of the seals are each coupled to a form comprising a non-metallic solidified material, a distal axial opening, a proximal axial opening, and a lateral wall between the distal axial opening and the proximal axial opening. The lateral wall comprises at least one through lateral opening.

Yet another example of the present disclosure relates to a method of forming a seal about at least a portion of an object. The method comprises placing a form, comprising a non-metallic solidified material and at least one through lateral opening, about the at least a portion of the object, and flowing a viscous substance into the form and about the at least a portion of the object.

BRIEF DESCRIPTION OF THE DRAWINGS

Figure 1:
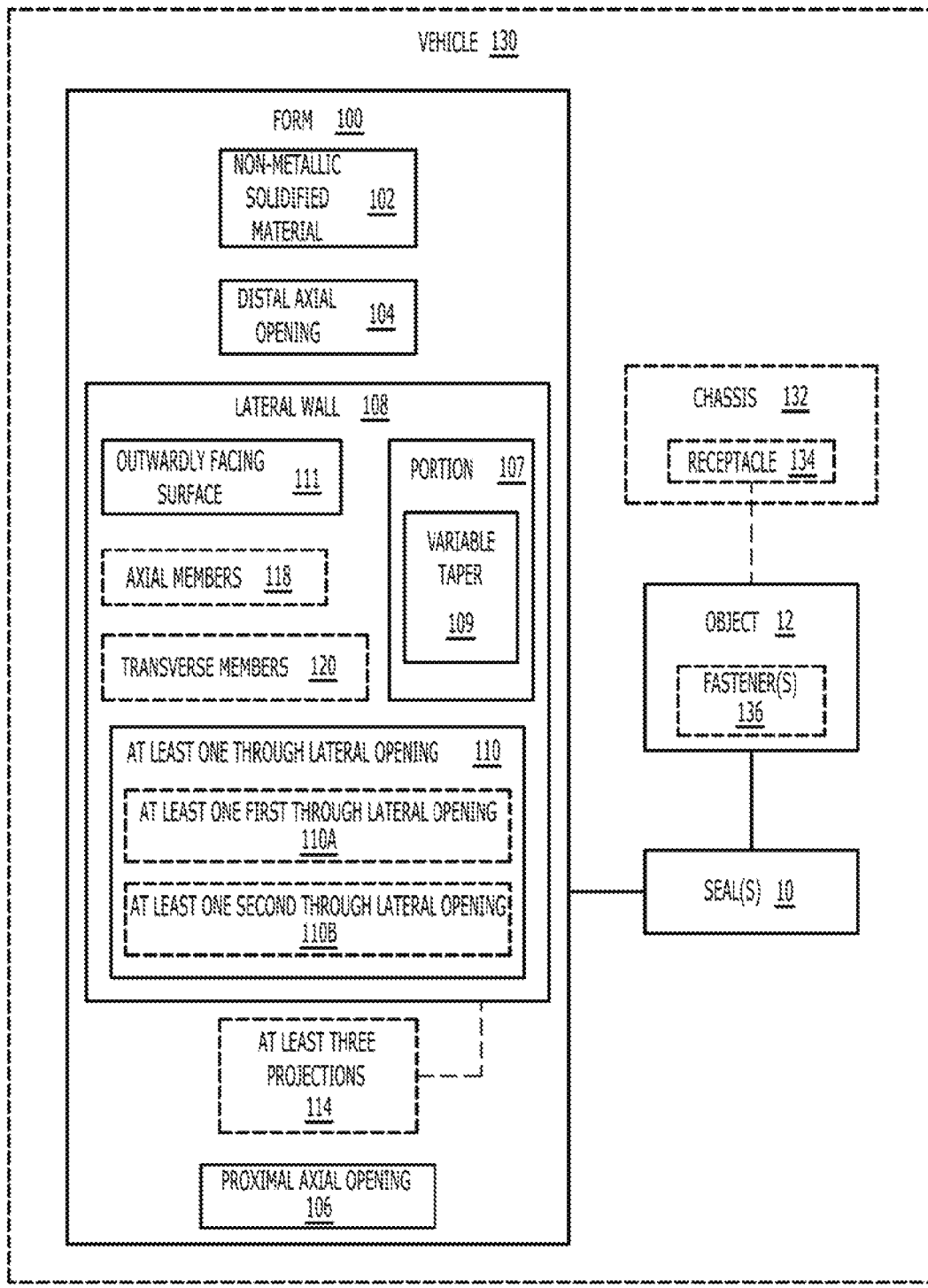
Figure 2:
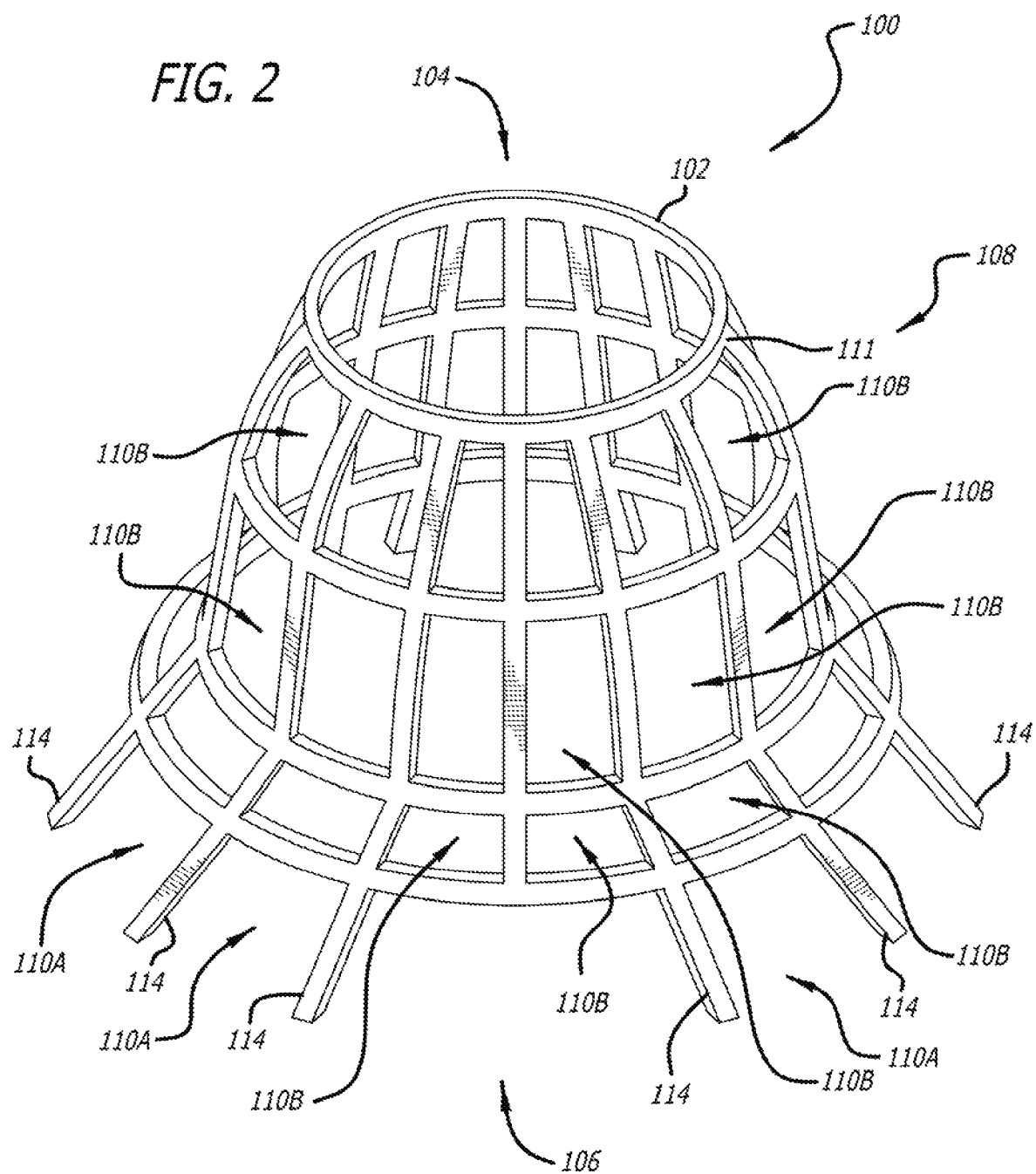
Figure 3:
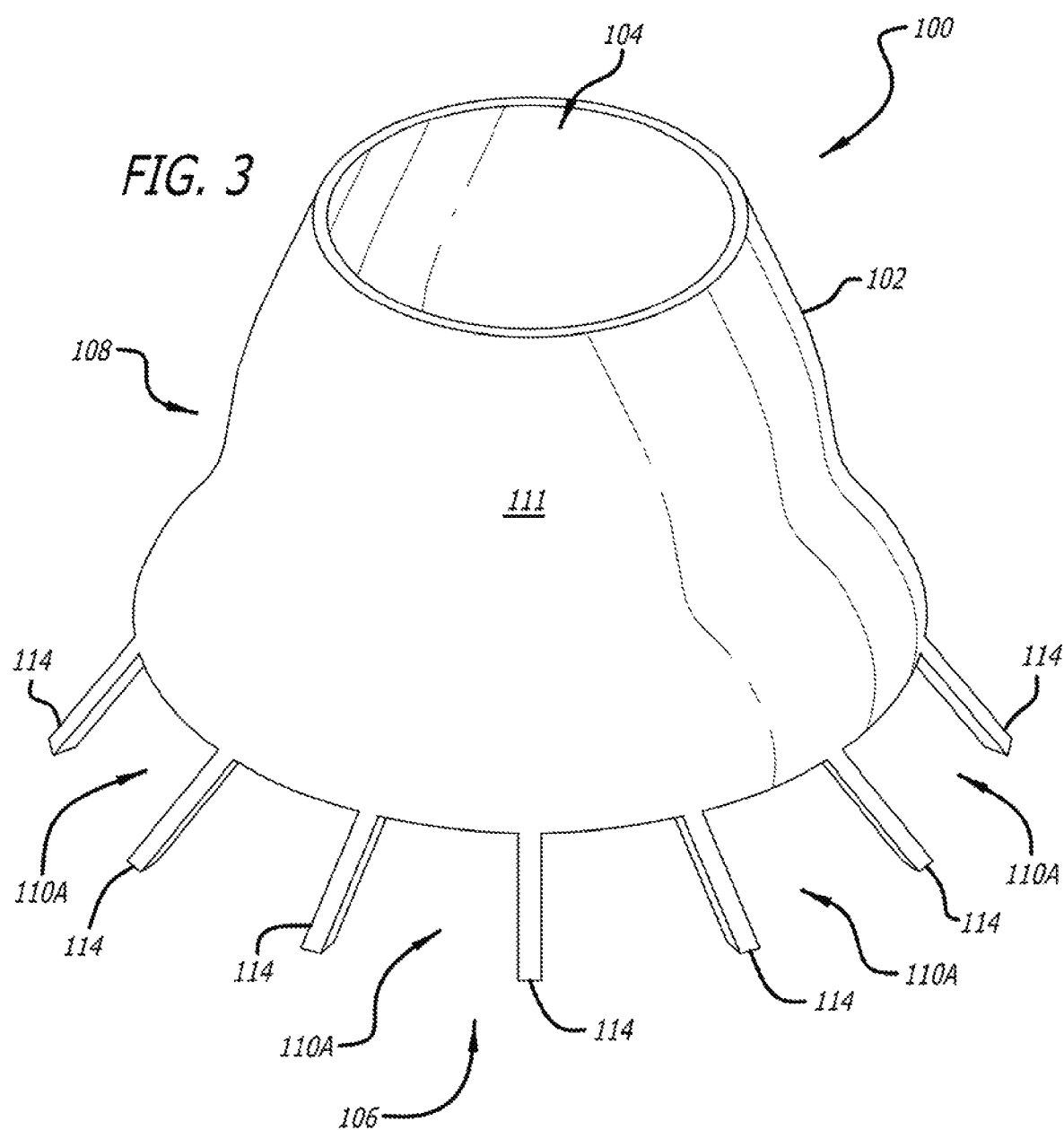
Figure 4:
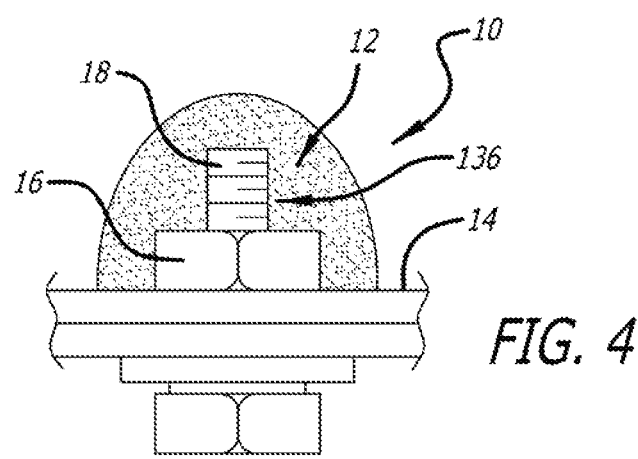
Figure 5:
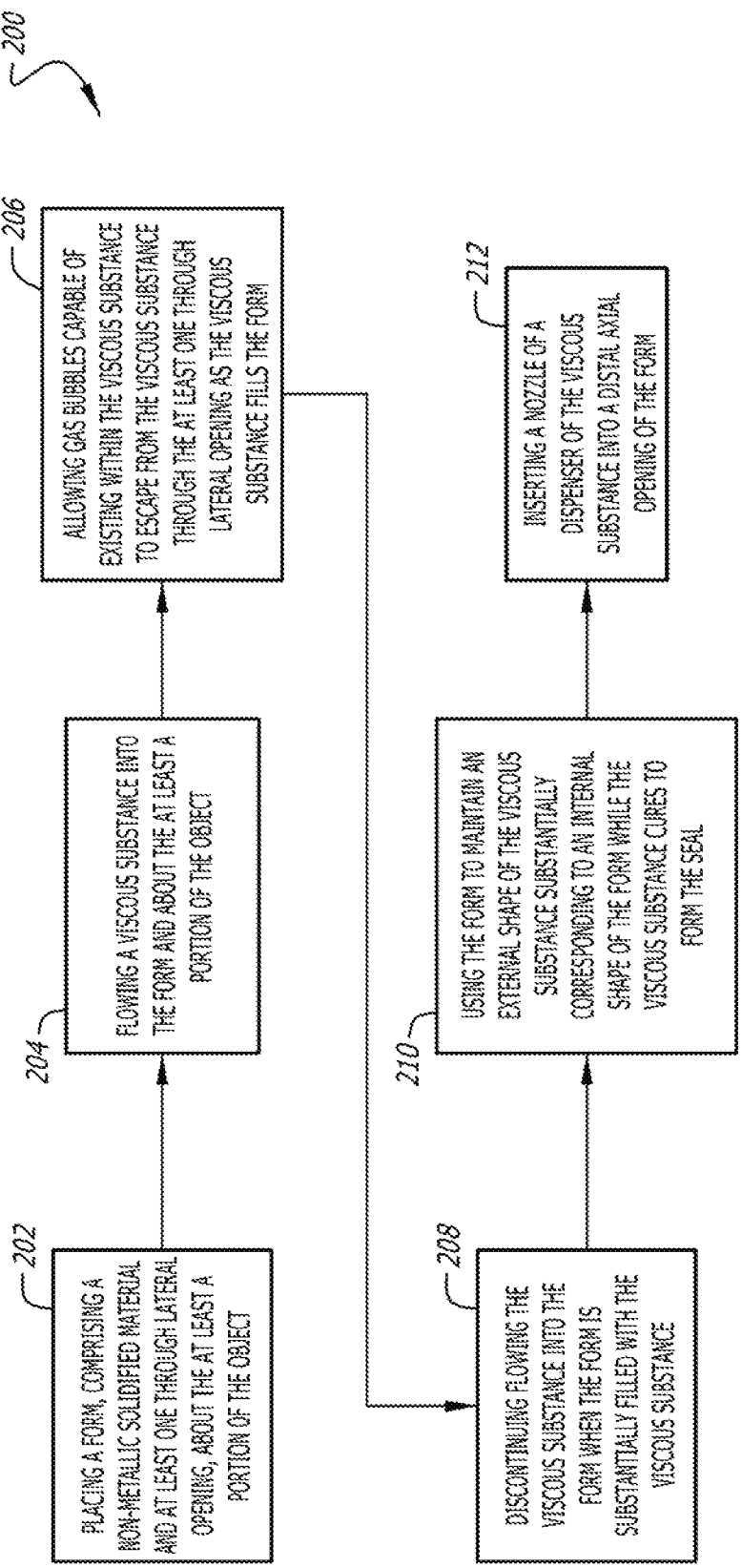
Figure 6:
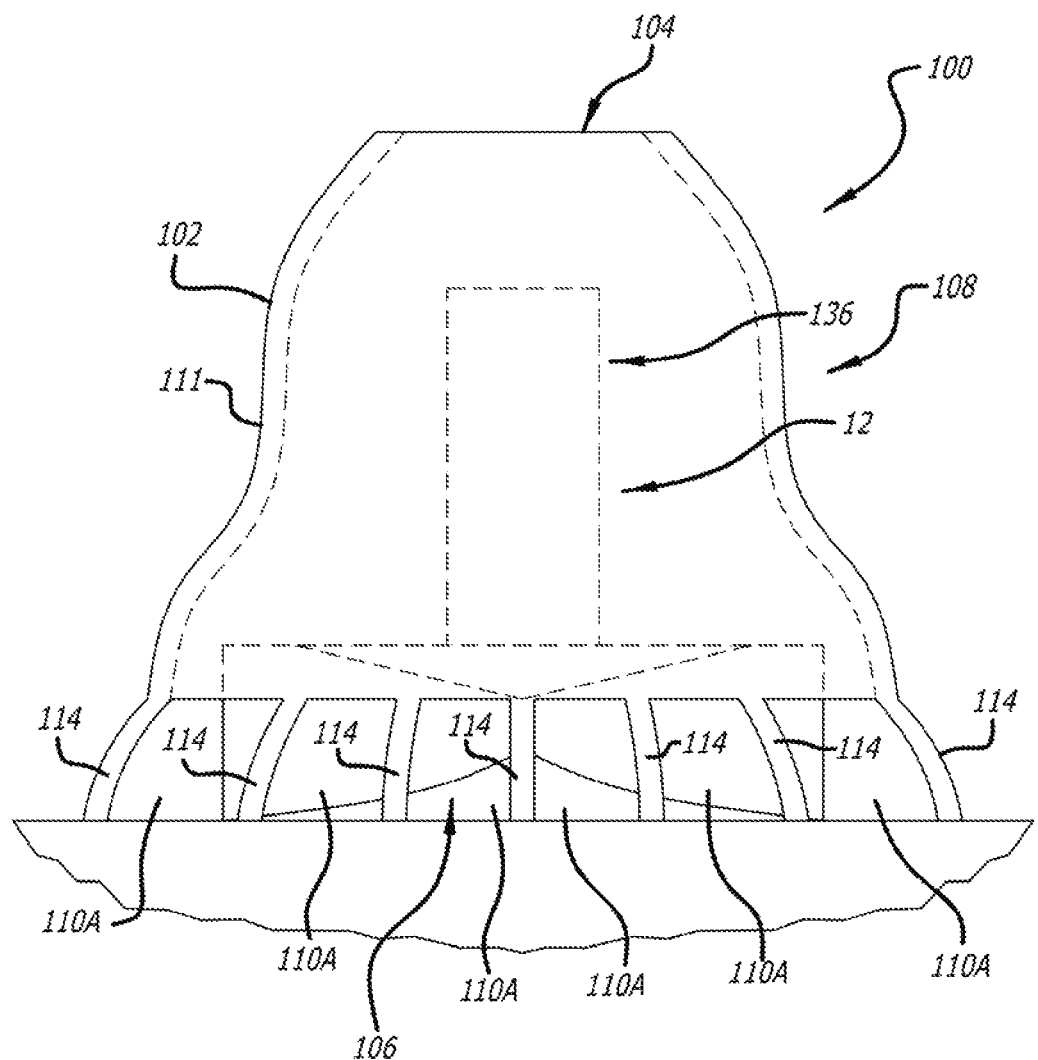
Figure 7:
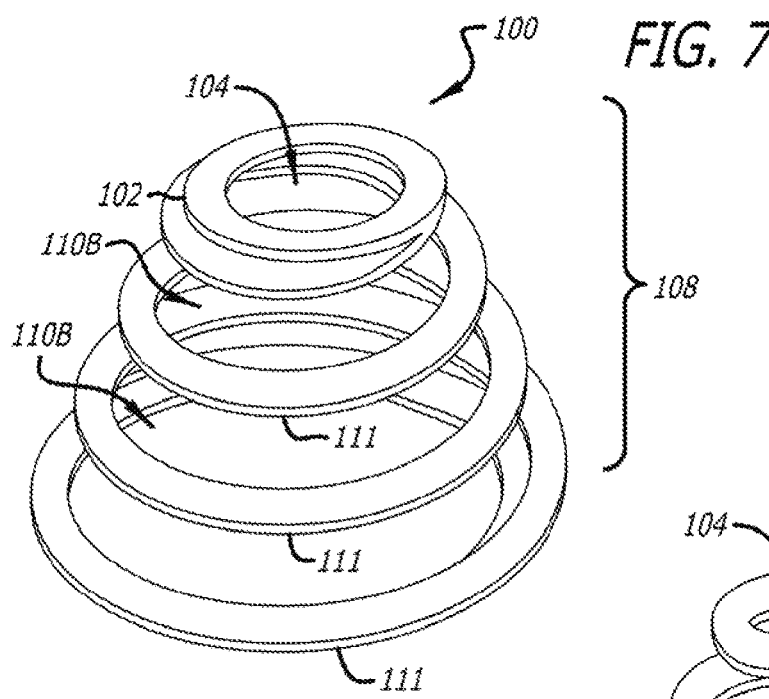
Figure 8:
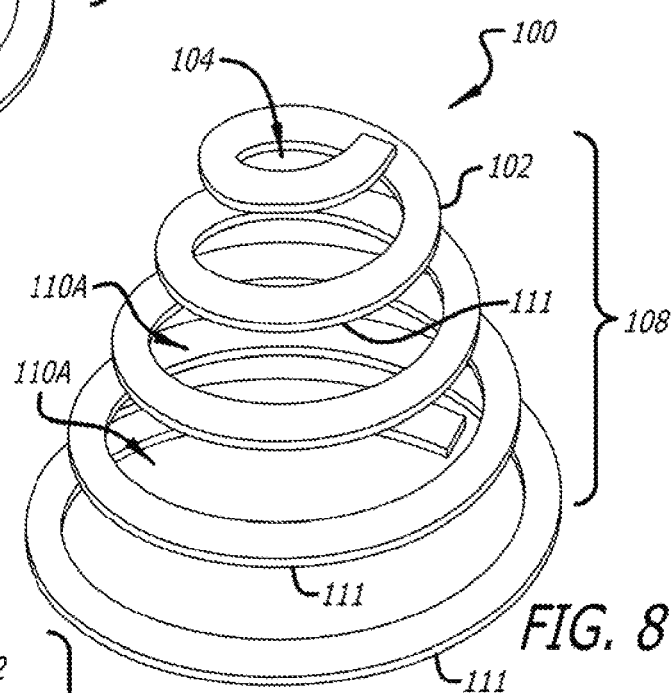
Figure 9:
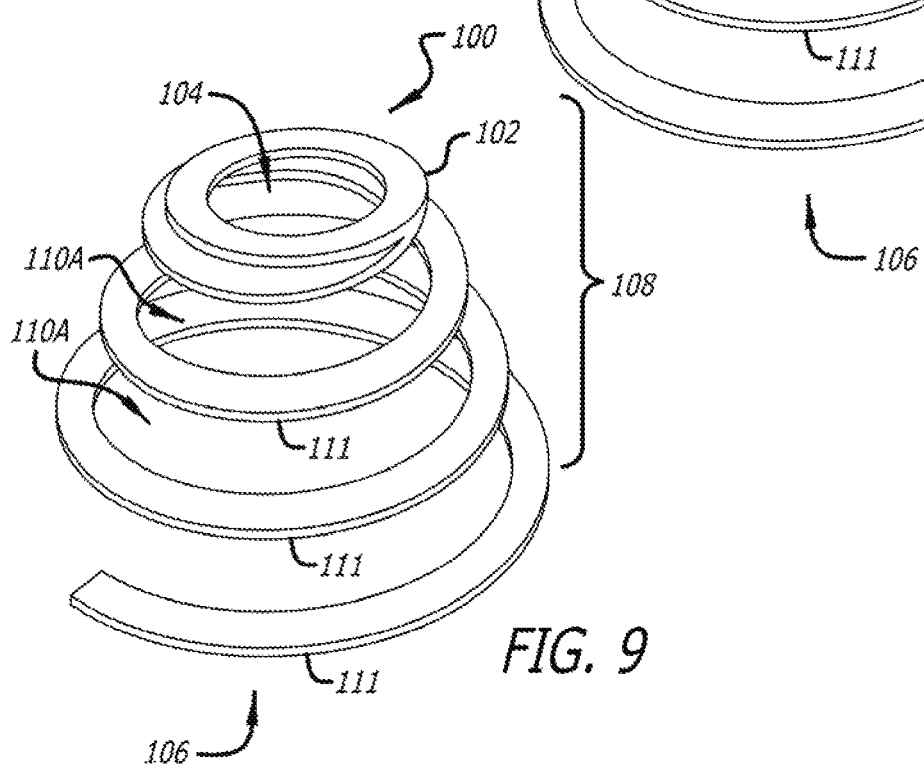
Figure 10:
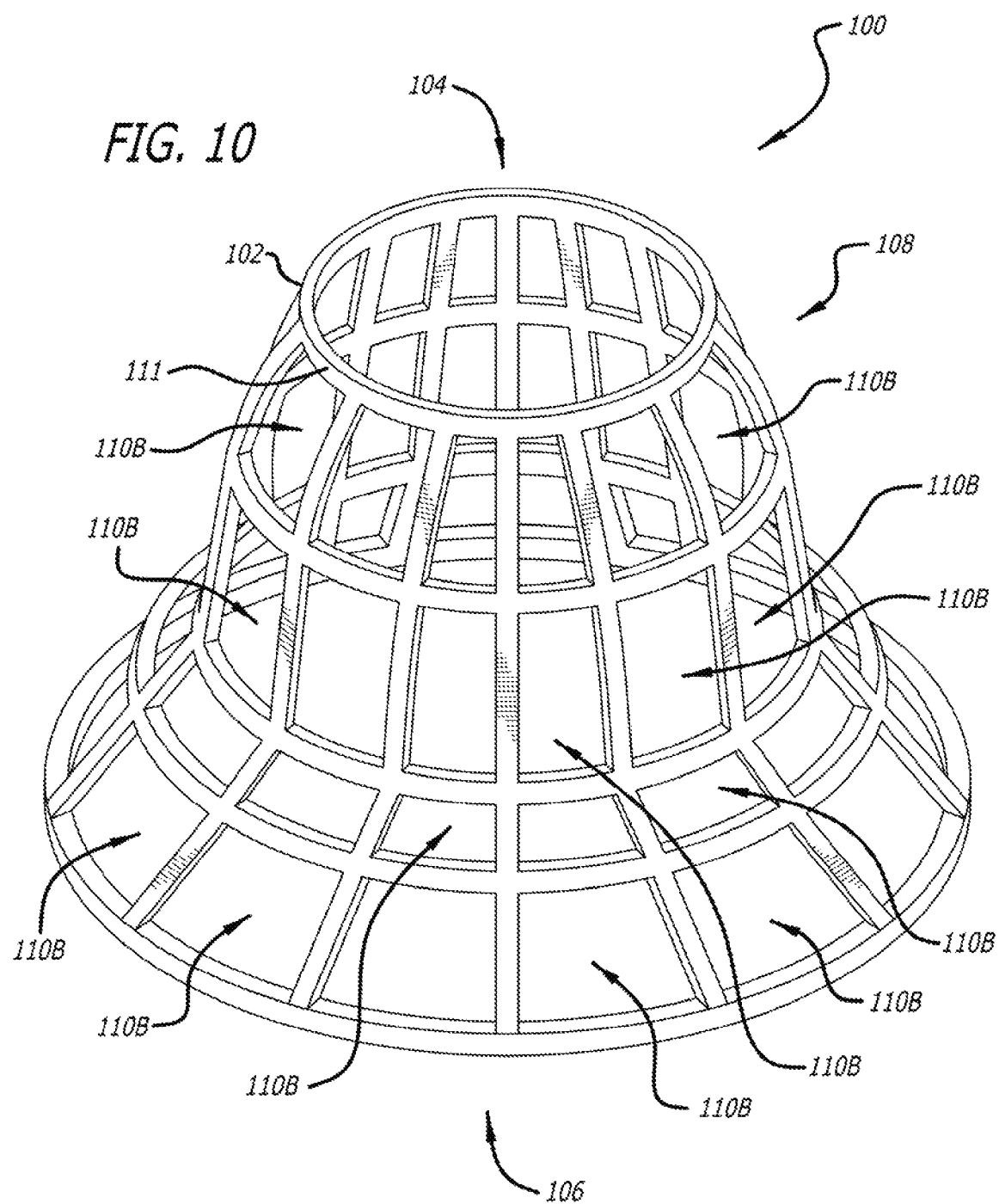
Figure 11:
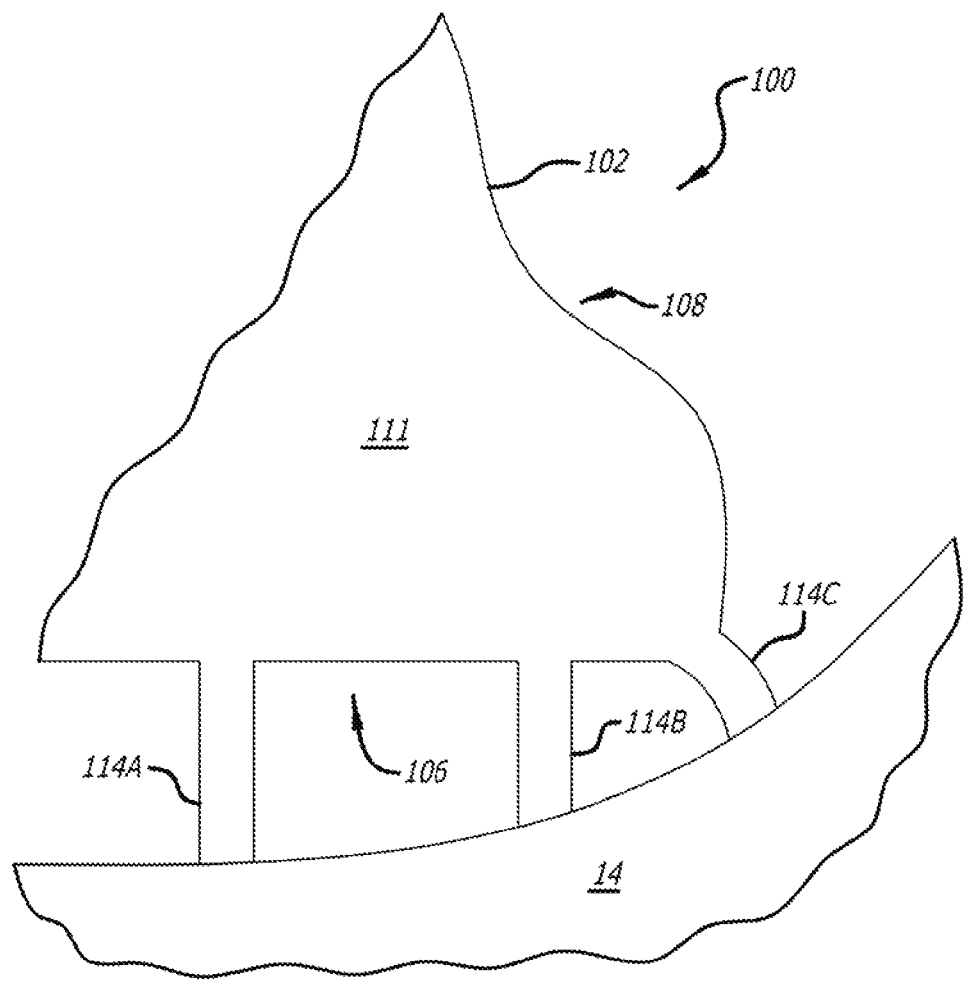
Figure 12:
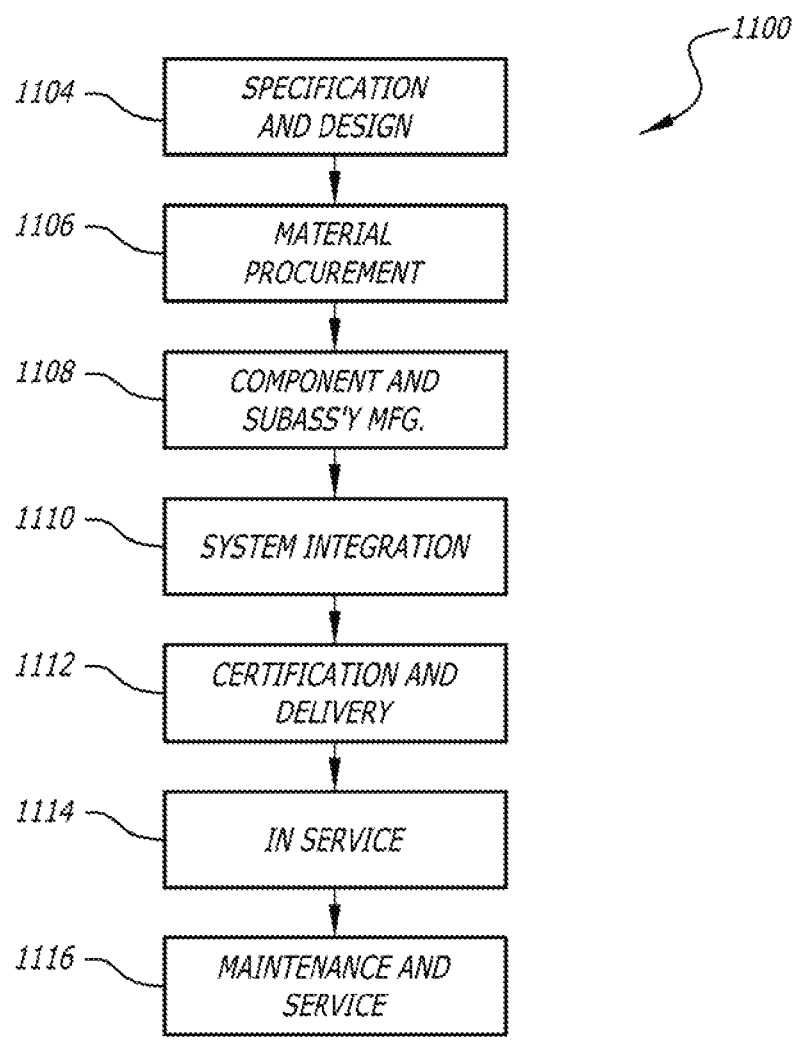
Figure 13:
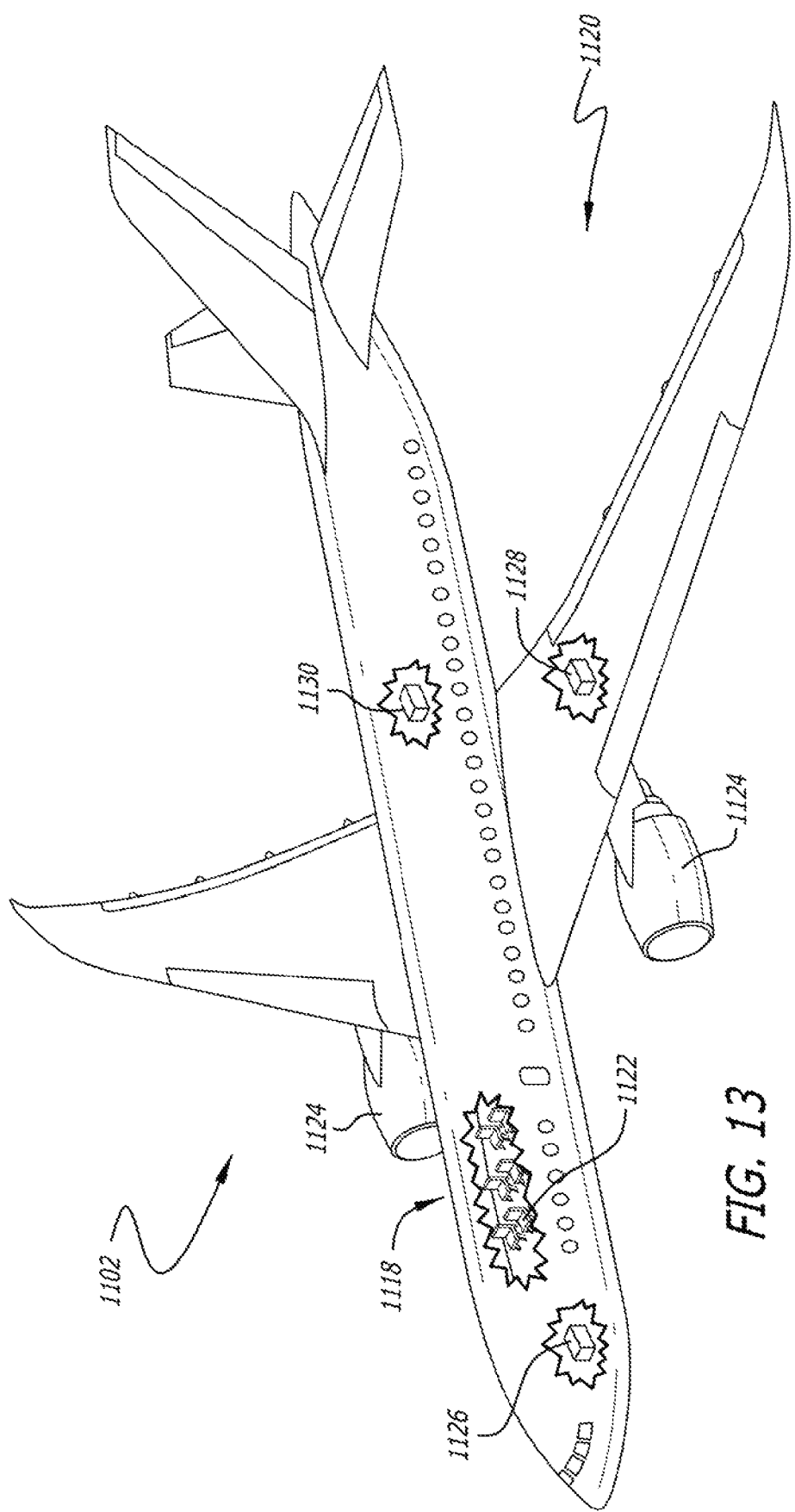

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a form for supporting a volume of a viscous substance encapsulating at least a portion of an object;

FIG. 2 is a schematic perspective view of the form of FIG. 1, according to one or more examples of the present disclosure;

FIG. 3 is a schematic perspective view of the form of FIG. 1, according to one or more examples of the present disclosure;

FIG. 4 is a schematic side view of a seal fabricated using the form of FIG. 1, according to one or more examples of the present disclosure;

FIG. 5 is a block diagram of a method of utilizing the form of FIG. 1 to form the seal illustrated in FIG. 4, according to one or more examples of the present disclosure;

FIG. 6 is a schematic side elevational view of the form of FIG. 1, according to one or more examples of the present disclosure;

FIG. 7 is a schematic perspective view of the form of FIG. 1, according to one or more examples of the present disclosure;

FIG. 8 is schematic perspective view of the form of FIG. 1, according to one or more examples of the present disclosure;

FIG. 9 is schematic perspective view of the form of FIG. 1, according to one or more examples of the present disclosure;

FIG. 10 is a schematic side elevational view of the form of FIG. 1, according to one or more examples of the present disclosure;

FIG. 11 is a schematic side elevational view of a detail of the form of FIG. 1, according to one or more examples of the present disclosure;

FIG. 12 is a block diagram of aircraft production and service methodology; and FIG. 13 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 11, referred to above, the blocks may represent operations and/or portions thereof and lines connecting the various blocks do not imply any particular order or dependency of the operations or portions thereof. FIGS. 5 and 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" means that one or more feature, structure, or characteristic described in connection with the example is included in at least one implementation. The phrase "one example" in various places in the specification may or may not be referring to the same example.

Illustrative, non-exhaustive examples of the subject matter according the present disclosure, which may or may not be claimed, are provided below.

Referring e.g., to FIGS. 1-4 and 6-11, the instant paragraph pertains to example 1 of the present disclosure. Example 1 relates to form 100 for supporting a volume of a viscous substance encapsulating at least a portion of object 12 while the viscous substance solidifies to form seal 10 (FIG. 4). Form 100 comprises non-metallic solidified material 102, distal axial opening 104, proximal axial opening 106, and lateral wall 108 between distal axial opening 104 and proximal axial opening 106. Lateral wall 108 comprises outwardly facing surface 111 having a surface area. Lateral wall 108 also comprises at least one through lateral opening 110A.

As used herein, the surface area of outwardly facing surface 111 includes the area of the solid portion of lateral wall 108 combined with the area of all of through lateral openings 110. Additionally, through lateral opening(s) 110 include one or both first through lateral opening(s) 110A and second through lateral opening(s) 110B, as will be described in detail below. The viscous substance is, for example, a sealant such as PR-1776, a Class C, low weight, fuel tank sealant commercially available from PRC-DeSoto International, Inc., 12780 San Fernando Road, Sylmar, Calif. 91342. Typically dispensed from a dispensing gun, the viscous substance is fluent, and may slump spontaneously if not suitably constrained. In the example of FIG. 4, seal 10, depicted after its constituent viscous substance has cured or solidified, is shaped as a dome over object 12. Seal 10 is intended to cover object 12 to a specified depth or thickness, and is deposited over both object 12 and also a portion of substrate 14 through which object 12 protrudes. Object 12 may be fastener 136 (see FIG. 4). Object 12 may be an article other than fastener 136. For example, object 12 may be a temperature probe (not shown) or an element of substrate 14, such as a tab or tongue (not shown). Form 100 guides flow of the viscous substance to assure specified coverage over object 12, and also constrains the viscous substance to a desired configuration (such as the dome illustrated in FIG. 4) until the viscous substance has solidified sufficiently to maintain its configuration.

The viscous substance is discharged from a dispensing gun (not shown) or other source into distal axial opening 104, and flows over object 12 (FIG. 4) toward proximal axial opening 106. Excess viscous substance exits form 100 from through lateral opening(s) 110.

Referring generally to FIG. 1 and particularly to e.g. FIGS. 2-3 and 6-11, the instant paragraph pertains to example 2 of the present disclosure. In example 2, which includes the subject matter of example 1, at least portion 107 of lateral wall 108 is tapered outwardly from distal axial opening 104 to proximal axial opening 106.

Tapering signifies that the overall width, as shown in FIGS. 2-3 and 7-10, and as particularly shown in FIG. 6, increases from distal axial opening 104 to proximal axial opening 106. Outward taper accommodates a wider base of the final seal 10, necessary to maintain the specified coverage over a nut 16 associated with object 12, or over other structure (not shown) causing object 12 to be wider proximate substrate 14 than at its free end 18.

Referring generally to FIG. 1 and particularly to e.g. FIGS. 2-3, 6, and 10-11, the instant paragraph pertains to example 3 of the present disclosure. In example 3, which includes the subject matter of example 2, at least portion 107 of lateral wall 108 comprises variable taper 109.

Variable taper minimizes the amount of constituent viscous substance required to form seal 10, while also accommodating variations in the width of object 12, such as that caused by nut 16, washers, variations in width of object 12, and/or other structure (none shown).

Referring generally to FIG. 1 and particularly to e.g. FIGS. 2 and 10, the instant paragraph pertains to example 4 of the present disclosure. In example 4, which includes the subject matter of any of examples 1-3, at least one through lateral opening 110 has an opening area. The outwardly facing surface 111 of the lateral wall 108 has a surface area. A ratio of the opening area to the surface area of outwardly facing surface 111 is between about 0.2 and about 0.6.

Ratios in this range promote escape of any air entrapped in the sealant, while permitting formation of a desired shape of seal 10, such as the domed configuration illustrated e.g. in FIG. 4. Those skilled in the art will appreciate that each through lateral opening 110 is sized and shaped such as to permit formation of seal 10 without allowing viscous substance to slump through the lateral opening 110.

Referring generally to FIGS. 2-3 and 6-11 and particularly to e.g. FIGS. 1 and 4, the instant paragraph pertains to example 6 of the present disclosure. In example 6, which includes the subject matter of any of examples 1-4, seal 10 and non-metallic solidified material 102 of form 100 are chemically different.

The chemical difference between seal 10 and non-metallic solidified material 102 enables form 100 to be fabricated from substances other than that being used to form seal 10. For example, form 100 may be fabricated from a constituent material of greater rigidity than if fabricated from the viscous substance of the seal 10.

Referring generally to FIGS. 2-3 and 6-11 and particularly to e.g. FIGS. 1 and 4, the instant paragraph pertains to example 5 of the present disclosure. In example 5, which includes the subject matter of any of examples 1-3, seal 10 and non-metallic solidified material 102 of form 100 are substantially chemically identical.

Identical constituency of form 100 and seal 10 allows for abandonment of form 100 in place after formation of seal 10, while preserving effectiveness of coverage of object 12. This may be desirable where the viscous substance has flowed around and entrapped form 100, or merely as a labor-saving expedient.

Referring generally to FIG. 1 and particularly to e.g. FIGS. 2-3, 6, and 11, the instant paragraph pertains to example 7 of the present disclosure. In example 7, which includes the subject matter of any of examples 1-6, form 100 comprises at least three projections 114 extending from lateral wall 108 proximate proximal axial opening 106.

In one example, projections 114 delimit first through lateral openings 110A, discussed below.

Referring generally to FIG. 1 and particularly to e.g. FIG. 11, the instant paragraph pertains to example 8 of the present disclosure. In example 8, which includes the subject matter of example 7, at least one of projections 114 differs in length from another one of projections 114.

Projections 114 of different length accommodate placement of associated form 100 on a non-planar surface, such as, for example, where substrate 14 makes a rounded or curved transition from horizontal to vertical. To accommodate this curvature, projections 114 include e.g. projection 114A, projection 114B of length slightly less than that of projection 114A, and projection 114C of length less than those of projections 114A and 114B.

Referring generally to FIG. 1 and particularly to e.g. FIGS. 2-3, 6, 8-9, and 11, the instant paragraph pertains to example 9 of the present disclosure. In example 9, which includes the subject matter of any of examples 1-8, at least one through lateral opening 110 comprises at least one first through lateral opening 110A partially bounded by lateral wall 108.

Partial bounding signifies that first through lateral opening 110A is not fully bounded and enclosed solely by form 100. Full bounding may be accomplished for example by placing form 100 against substrate 14 (FIG. 4), whereupon form 100 and substrate 14 collectively fully bound through lateral openings 110A. Unobstructed discharge of excess viscous substance occurs unimpeded through partially bounded first through lateral opening 110A. When form 100 is oriented as shown e.g. in FIG. 2 and resultant seal 10 is oriented as shown e.g. in FIG. 4, excess viscous substance is discharged at the bottom of form 100, with incoming viscous substance being introduced at the top of form 100.

Referring generally to FIG. 1 and particularly to e.g. FIGS. 8 and 9, the instant paragraph pertains to example 10 of the present disclosure. In example 10, which includes the subject matter of example 9, at least a portion of at least one of at least one first through lateral opening 110A is spiral-shaped.

Form 100 incorporating the spiral-shape enjoys the benefit of being removable from a completed seal 10 (FIG. 4) by unwinding or unraveling.

Referring generally to FIG. 1 and particularly to e.g. FIGS. 2, 7, and 10, the instant paragraph pertains to example 11 of the present disclosure. In example 11, which includes the subject matter of any of examples 9-10, at least one through lateral opening 110 comprises at least one second through lateral opening 110B fully bounded by lateral wall 108.

A fully bounded second through lateral opening 110B facilitates passage of air bubbles through lateral wall 108 of form 100. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring generally to FIG. 1 and particularly to e.g. FIG. 7, the instant paragraph pertains to example 12 of the present disclosure. In example 12, which includes the subject matter of example 11, at least a portion of the at least one second through lateral opening 110B is spiral-shaped.

In one example, form 100 incorporating the spiral-shape may be removed from a completed seal 10 (FIG. 4) by unwinding or unraveling, if desired.

Referring generally to FIG. 1 and particularly to e.g. FIGS. 2, 7, and 10, the instant paragraph pertains to example 13 of the present disclosure. In example 13, which includes the subject matter of any of examples 1-8, at least one through lateral opening 110 comprises at least one second through lateral opening 110B fully bounded by lateral wall 108.

Fully bounded second through lateral opening 110B enables air bubbles, where present, to exit form 100 through lateral wall 108.

Referring generally to FIG. 1 and particularly to e.g. FIG. 7, the instant paragraph pertains to example 14 of the present disclosure. In example 14, which includes the subject matter of example 13, at least a portion of at least one of at least one second through lateral opening 110B is spiral-shaped.

Form 100 incorporating the spiral-shape may be removed from a completed seal 10 (FIG. 4) by unwinding or unraveling, if desired.

In FIG. 8, form 100 has partially bounded through lateral opening 110A. In FIG. 9, through lateral opening 110A is partially bounded, being open at its lower end (as depicted in FIG. 9), despite the upper end being closed.

Either or both of first or second through lateral openings 110A, 110B could be configured as only partially being spiraled, with the balance of respective first or second through lateral openings 110A or 110B being of another configuration.

Referring generally to FIG. 1 and particularly to e.g. FIGS. 4 and 13, the instant paragraph pertains to example 15 of the present disclosure. Example 15 relates to vehicle 130 comprising chassis 132 comprising receptacle 134, plurality of fasteners 136 protruding into receptacle 134, and seal 10 installed on each one of plurality of fasteners 136 protruding into receptacle 134. At least some seals 10 are each coupled to form 100 comprising non-metallic solidified material 102, distal axial opening 104, proximal axial opening 106, and lateral wall 108 between distal axial opening 104 and proximal axial opening 106. Lateral wall 108 comprises at least one through lateral opening 110.

Seals 10 coupled to form 100 enable forms 100 to be abandoned in place after fabricating seals 10, thereby shaping and reducing labor to fabricate seals 10, and hence reducing the overall cost of vehicle 130.

Referring generally to FIG. 1 and particularly to e.g. FIGS. 2, 3, 6, 8, 9, and 11, the instant paragraph pertains to example 16 of the present disclosure. In example 16, which includes the subject matter of example 15, the at least one through lateral opening 110 comprises at least one first through lateral opening 110A partially bounded by lateral wall 108.

Unobstructed discharge of excess viscous substance occurs unimpeded through partially bounded first through lateral opening 110A.

Referring generally to FIG. 1 and particularly to e.g. FIGS. 2, 7 and 10, the instant paragraph pertains to example 17 of the present disclosure. In example 17, which includes the subject matter of any of examples 15-16, the at least one through lateral opening 110 comprises at least one second through lateral opening 110B fully bounded by the lateral wall 108.

At least one second through lateral opening 110B enables discharge of air bubbles from form 100 when assembling vehicle 130, as the viscous substance flows through the form 100.

Referring e.g. to FIGS. 2-4 and 6-11, and particularly to FIGS. 1 and 13, in one example of the present disclosure, which may include at least a portion of the subject matter of any of examples 15-17, receptacle 134 is a fluid storage tank. Fluid storage tanks for flammable fluids are protected by seal 10 fabricated using form 100.

Referring e.g. to FIGS. 3 and 6, in one example of the present disclosure, form 100 includes only first through lateral openings 110A, and no second through lateral openings 110B. Excess viscous substance is readily discharged from form 100 thereby. Referring e.g. to FIGS. 7 and 10, in one example of the present disclosure, form 100 includes only second through lateral openings 110B, and no first through lateral openings 110A. Air bubbles in the viscous substance may be discharged through lateral wall 108 thereby.

Examples of the present disclosure may be described in the context of aircraft manufacturing and service method 1100 as shown in FIG. 12 and aircraft 1102 as shown in FIG. 13. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more examples of the apparatus, method, or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service, e.g., maintenance and service stage (block 1116).

Referring e.g. to FIGS. 2-4 and 6-11, and particularly to FIGS. 1 and 13, in one example of the present disclosure, which may include at least a portion of the subject matter of any of examples 15-17, vehicle 130 further comprises propulsion system 1124, and receptacle 134 is a fuel tank in fluid communication with propulsion system 1124. Self-powered vehicles may have fuel tanks protected by seal(s) 10 economically fabricated using form 100. It is possible that receptacle 134 be payload bearing, rather than being a fuel tank. Payload bearing receptacles, fuel tanks, and still other receptacles may utilize form 100.

Still referring e.g. to FIGS. 2-4 and 6-11, and particularly to FIGS. 1 and 13, in one example of the present disclosure, which may include at least a portion of the subject matter of any of examples 15-17, vehicle 130 is aircraft 1102 (FIG. 13) further comprising airframe 1118 with a plurality of high-level systems 1120 and interior 1122, high-level systems 1120 including at least one of propulsion system 1124, electrical system 1126, hydraulic system 1128, and environmental system 1130. Aircraft 1102 may be a large scale passenger or freight carrying aircraft, having two or more turbine engines (not shown), for example. Where vehicle 130 is aircraft 1102, chassis 132 is provided by airframe 1118. Cost of producing aircraft 1102 is reduced when a large number of fasteners 136 used in large scale aircraft 1102 are sealed using form 100.

Referring e.g. to FIG. 5, the instant paragraph pertains to example 18 of the present disclosure. Example 18 relates to method 200 of forming seal 10 about at least a portion of object 12. Method 200 comprises placing form 100, comprising non-metallic solidified material 102 and at least one through lateral opening 110, about at least a portion of object 12 (block 202), and flowing the viscous substance into form 100 and about at least a portion of object 12 (block 204).

As used herein, "about" signifies that seal 10 is located over, encapsulates, coats, or covers at least a portion of object 12. For example, a portion of object 12 on one side of substrate 14 in FIG. 4 may be in a hazardous area, and therefore may require covering by seal 10; however, that portion of object 12 on the other side of substrate 14 may lie outside the hazardous area and thus need not be protected by seal 10.

Still referring e.g. to FIG. 5, the instant paragraph pertains to example 19 of the present disclosure. In example 19, which includes the subject matter of example 18, method 200 further comprises allowing gas bubbles capable of existing within viscous substance to escape from the viscous substance through at least one through lateral opening 110 as the viscous substance fills form 100 (block 206).

Presence of gas or air bubbles may impair effectiveness of seal 10; hence ejection of the air or gas bubbles through at least one through lateral opening 110 may promote effectiveness and integrity of seal 10.

Still referring e.g. to FIG. 5, the instant paragraph pertains to example 20 of the present disclosure. In example 20, which includes the subject matter of any of examples 18-19, method 200 further comprises discontinuing flowing the viscous substance into form 100 when form 100 is substantially filled with the viscous substance (block 208).

Discontinuing flowing of the viscous substance may prevent or minimize waste of the viscous substance.

Continuing to refer e.g. to FIG. 5, the instant paragraph pertains to example 21 of the present disclosure. In example 21, which includes the subject matter of any of examples 18-20, method 200 further comprises using form 100 to maintain external shape of the viscous substance substantially corresponding to internal shape of form 100 while the viscous substance cures to form seal 10 (block 210).

Using form 100 to maintain or determine external shape avoids reliance on forming the dome of seal 10 by hand, hence expediting forming seal(s) 10 and minimizing rework.

Still referring e.g. to FIG. 5, the instant paragraph pertains to example 22 of the present disclosure. In example 22, which includes the subject matter of any of examples 18-21, flowing the viscous substance into form 100 comprises inserting a nozzle of a dispenser of viscous substance into distal axial opening 104 of form 100 (block 212).

Dispensing the viscous substance to the interior of form 100 may promote orderly flow of the viscous substance into form 100 and effective evacuation of air from around object 12 during such flow.

Different examples of the apparatus and methods disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A method of forming a seal about at least a portion of an object, using a form, comprising a non-metallic solidified material, at least one through lateral opening, a distal axial opening, a proximal axial opening, and a lateral wall, between the distal axial opening and the proximal axial opening, configured such that at least a portion of the at least one through lateral opening is spiral-shaped, the method comprising:
   placing the form about the at least a portion of the object;
   flowing a viscous substance into the form and about the at least a portion of the object; and
   removing the form from the object by unwinding or unraveling the form to form the seal.

2. The method of claim 1, further comprising allowing gas bubbles capable of existing within the viscous substance to escape from the viscous substance through the at least one through lateral opening as the viscous substance fills the form.

3. The method of claim 1, further comprising discontinuing flowing the viscous substance into the form when the form is substantially filled with the viscous substance.

4. The method of claim 1, further comprising using the form to maintain an external shape of the viscous substance substantially corresponding to an internal shape of the form while the viscous substance cures to form the seal.

5. The method of claim 1; wherein flowing the viscous substance into the form comprises inserting a nozzle of a dispenser of the viscous substance into the distal axial opening of the form.

6. The method of claim 1, wherein the object is selected from the group consisting of a fastener, a temperature probe, a tab, and a tongue.

7. The method of claim 1, further comprising allowing an excess of the viscous substance to escape through the at least one through lateral opening as the viscous substance fills the form.

8. The method of claim 1,
   wherein at least a portion of the lateral wall is tapered outwardly from the distal axial opening to the proximal axial opening.

9. The method of claim 8, wherein the at least a portion of the lateral wall comprises a variable taper.

10. The method of claim 8, wherein the form further comprises at least three projections, extending from the lateral wall at the proximal axial opening.

11. The method of claim 10, wherein, prior to placing the form about the at least a portion of the object, at least one of the at least three projections differs in length from another one of the at least three projections.

12. The method of claim 11, wherein the object protrudes through a substrate having a non-planar surface, and wherein each of the at least three projections contacts the non-planar surface of the substrate.

13. The method of claim 1, wherein the at least one through lateral opening is partially bounded by the lateral wall.

14. The method of claim 13, wherein the object protrudes through a substrate having a surface contacted by the form, and wherein an excess of the viscous substance is allowed to escape through the at least one through lateral opening at an interface of the form and the substrate as the viscous substance fills the form.

15. The method of claim 8, wherein the at least one through lateral opening is fully bounded by the lateral wall.

16. The method of claim 1, wherein the viscous substance forming the seal and the non-metallic solidified material of the form are chemically different.

17. The method of claim 1, wherein the viscous substance forming the seal and the non-metallic solidified material of the form are substantially chemically identical.

18. The method of claim 1, wherein the distal axial opening is circumferentially closed.

19. The method of claim 1, wherein the proximal axial opening circumferentially closed.

20. The method of claim 1, wherein:
- the at least one through lateral opening has an opening area;
- the lateral wall comprises an outwardly facing surface, having a surface area; and
- a ratio of the opening area to the surface area is between about 0.2 and about 0.6.

\* \* \* \* \*